United States Patent Office 3,415,821
Patented Dec. 10, 1968

3,415,821
1-(5-SUBSTITUTED)FURFURYLIDENEAMINO HYDANTOINS AND IMIDAZOLIDINONES
Charles Stewert Davis and Harry Raymond Snyder, Jr., Norwich, N.Y., assignors to The Norwich Pharmacal Company, a corporation of New York
No Drawing. Filed Sept. 7, 1965, Ser. No. 485,566
9 Claims. (Cl. 260—240)

ABSTRACT OF THE DISCLOSURE

New 1-(5-substitued)furfurylideneamino hydantoins and imidazolidinones: useful as a muscle relaxant.

---

This invention relates to chemical compounds. More particularly, it is concerned with a series of 1-[(5-substituted furfurylideneamino]-hydantoins and imidazolidinones of the formula:

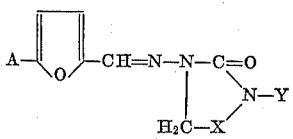

wherein A represents a member of the group consisting of furyl and

in which R represents from one to two substitutents selected from the group consisting of nitro, cyano, amino, chloro, bromo, acetyl, carboxy, methyl, trifluoromethyl and hydrogen; X represents a member of the group consisting of carbonyl and methylene; and Y represents a member of the group consisting of hydroxyethyl, hydrogen, butyl, and 4-pyridylethyl; and to methods for the preparation thereof.

The members of this series of chemical compounds possess pharmacological activity. In particular, they are useful as muscle relaxants when administered to warm-blooded animals. Thus, when administered intravenously in doses of from 1–10 mg./kg. to mice or cats, muscle relaxant effects are elicited. Such administration is readily and conveniently achieved using an acceptable parenteral carrier such as dimethylsulfoxide.

The preparation of the members of this series of compounds is conveniently carried out. It is presently preferred to prepare them by bringing together an aldehyde of the formula:

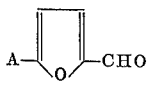

wherein A has the significance ascribed above and the hydrazine in the presence of a solvent such as dimethylformamide, water and the like which is inert under the conditions of the reaction. Heat may be supplied to the reaction mixture to hasten the reaction. The product thus produced may be further reacted as in the case of one bearing a nitrophenyl residue to yield the corresponding amino compound through conventional reducing means; for instance, hydrogenation in the presence of pallidium-on-charcoal, or to introduce the Y substituent in the formula as defined above through metallation; for instance, with sodium hydride, followed by treatment with an halide such as bromoethanol, butyl bromide and the like or through reaction with active ethylenic compounds such as vinylpyridine.

The aldehyde starting materials are either known to the art or readily prepared by treating the appropriately substituted aniline with nitrous acid followed by reaction with furfural in the presence of a catalyst such as cupric chloride. Alternatively, furan may be substituted for furfural and the aldehyde group subsequently introduced into the furyl moiety by means of dimethylformamide and phosphorous oxychloride.

The members of this series of compounds are readily formulated into pharmaceutical compositions such as tablets, suspensions, elixirs, capsules, solutions, and the like using adjuvants and vehicles commonly employed in the pharmeceutical art.

In order that this invention may be readily available to and understood by those skilled in the art, the following examples thereof are supplied:

EXAMPLE I
1-[5-(p-nitrophenyl)furfurylideneamino]hydantoin 5-(p-nitrophenyl)-2-furaldehyde (40.0 g., 0.2 mole) is dissolved in dimethylformamide. An aqueous solution of 1-aminohydantoin hydrochloride (30.0 g., 0.2 mole) is added. The solution is chilled and diluted with water. The crude material is collected and recrystallized from aqueous dimethylformamide to yield 10.0 g. (16%), M.P. 279–280° C.

*Analysis.*—Calcd. for $C_{14}H_{10}N_4O_5$: C, 53.50; H, 3.21; N, 17.83. Found: C, 53.28; H, 3.16; N, 17.89.

EXAMPLE II
1-[5-(p-aminophenyl)furfurylideneamino]hydantoin

The compound of Example I (15.7 g., 0.05 mole) is suspended in 250 ml. of ethanol. To this suspension is added 1.5 g. of 5% Pd/C suspended in water. The container is placed in a Parr hydrogenator and shaken under 40 pounds of hydrogen for ca. 1 hour or until no more hydrogen is taken up. The temperature rises to 34° C. The reaction mixture is filtered and the filtrate concentrated. The residue is recrystallized from diethylformamide and water to yield 7.5 g. (52%), M.P. 269–270° C.

*Analysis.*—Calcd. for $C_{14}H_{12}N_4O_3$: C, 59.15; H, 4.25; N, 19.71. Found: C, 59.15; H, 4.09; N, 20.00.

EXAMPLE III
1-[5-(m-nitrophenyl)furfurylideneamino]hydantoin m-Nitroaniline (138 g., 1.0 mole) is heated for 15 minutes with 150 ml. of conc. HCl and 200 ml. of water. Nearly all of the material dissolves before an additional 300 ml. of conc. HCl is added. The yellow suspension is cooled to 0° C. and then treated with a sodium nitrate solution (70 g., 1.0 mole in 350 ml. of water) at such a rate that the temperature is kept below 0° C. After the addition, the solution is stirred for 15 minutes. An acetone solution of freshly distilled furfural (96 g., 1.0 mole) is added, followed by a $CuCl_2 \cdot 2H_2O$ (20 g. in 30 ml. of water) solution. The solution is allowed to warm to 15° C. and kept at the temperature until nitrogen is no longer evolved (4–6 hours). The orange solid is then filtered and washed with $Na_2CO_3$ solution. The solid is then dissolved in 2.5 l. of dimethylformamide and then slowly added to 1-aminohydantoin hydrochloride (151 g., 1.0 mole) in 1 l. of water. The addition is made over a 3½ hour period. The solid is filtered and air dried overnight. The crude product (165 g.) is suspended in 300 ml. of acetone and filtered. The solid is washed with acetone. The yield is 88 g. (33%); M.P. 246–7.

*Analysis.*—Calcd. for $C_{14}H_{10}N_4O_5$: C, 53.50; H, 3.21; N, 17.83. Found: C, 53.62; H, 3.32; N, 18.25.

EXAMPLE IV
1-[5-(p-chlorophenyl)furfurylideneamino]hydantoin

A solution of p-chloroaniline (127.6 g., 1.0 mole), concentrated hydrochloric acid (150 ml.), and water (200 ml.) is stirred and heated for 10 minutes; then an additional 300 ml. of acid is added and cooled (−5–0° C.). The slurry is treated with sodium nitrite (70 g., in 350 ml. of water), keeping the temperature below 5° C., then stirred for 15 minutes. A solution of furfural (96 g., in acetone) is introduced, followed by cupric chloride (20 g., in 30 ml. of water). The temperature is allowed to rise to 15° C. and held for 5–6 hours. The solids are filtered and thoroughly washed with sodium carbonate solution. The 5-p-chlorophenyl-2-furfural thus produced is dissolved in dimethylformamide (1000 ml.) and slowly added to a solution of 1-aminohydantoin hydrochloride (151 g., 1.0 mole) in water (2000 ml.). The solid is filtered and air dried to yield 140 g. (44% overall, calcd. for p-chloroaniline); M.P. 275–77° C.

*Analysis.*—Calcd. for $C_{14}H_{10}ClN_3O_3$: C, 55.37; H, 3.32; N, 13.84. Found: C, 55.34; H, 3.20; N, 13.61.

EXAMPLE V

1-[5-(o-nitrophenyl)furfurylideneamino]hydantoin

A slurry of o-nitroaniline (138 g., 1.0 mole), water (200 ml.) and concentrated hydrochloric acid (150 ml.) is slightly heated for 15 minutes. An additional 300 ml. of concentrated hydrochloric acid is added; then the mixture is cooled below 0° C. To the mixture is added sodium nitrite (70 g., in 300 ml. of water) and thoroughly stirred for 20 minutes. Furfural (96 g., in acetone) is then added followed by cupric chloride (20 g., in 30 ml. of water). The temperature is allowed to rise to 15° C. and held for 6.5 hours. The solids are filtered and thoroughly washed with sodium carbonate solution. The aldehyde is dissolved in dimethylformamide (1000 ml.) and added slowly to a solution of 1-aminohydantoin hydrochloride (151 g., 1.0 mole) in 2000 ml. of water to yield 10 g. (32%). This may be purified by washing with acetone; M.P. 224–26° C.

*Analysis.*—Calcd. for $C_{14}H_{10}N_4O_5$: C, 53.51; H, 3.21; N, 17.83. Found: C, 53.30; H. 3.11; N, 17.69.

EXAMPLE VI

1-[5-(2,4-dichlorophenyl)furfurylideneamino]hydantoin 3,4-dichloroaniline (162 g., 1.0 mole) is heated with 450 ml. of concentrated hydrochloric acid and 200 ml. of water for 2 hours. The suspension is cooled to −10° C. before a solution of sodium nitride (70 g., 1.0 mole) is added. A solution is formed which is stirred for 30 minutes at 0° C. To the cold solution is added furfural (96 g., 1.0 mole) in 100 ml. of acetone, followed by cupric chloride dihydrate (20 g.) in 30 ml. of water. The solution is allowed to warm to 20° C. and then is stirred for an additional 5–6 hours. The solid is filtered and partially dried and then dissolved in 2 l. of dimethylformamide. The dimethylformamide solutions is added to 1-aminohydantoin hydrochloride (151 g., 1.0 mole) in 1.1 of water over a 2-hour period. The suspension is warmed to 37–40° C. and stirred for 3 hours. The suspension is poured into 3 l. of water and the solid filtered. The residue is washed with acetone to give 210 g. (62%); M.P. 274–6° C.

*Analysis.*—Calcd. for $C_{14}H_9Cl_2N_3O_3$: C, 49.72; H, 2.68; N, 20.97. Found: C, 49.93; H, 2.68; N, 21.03.

EXAMPLE VII

1-[5-(2-chloro-4-nitrophenyl)furfurylideneamino] hydantoin 2-chloro-4-nitroaniline (140 g., 0.8 mole) is heated (70° C.) for 15 minutes with 150 ml. of concentrated HCl and 200 ml. of water. Nearly all of the material dissolves before an additional 300 ml. of concentrated HCl is added. The yellow suspension is cooled to 0° C. (Dry Ice bath) and then treated with a sodium nitrite solution (70 g., 1.0 mole in 350 ml. of water) at such a rate that the temperature is kept below 0° C. After the addition, the solution is stirred for 1 hour. An acetone solution of freshly distilled furfural (96 g., 1.0 mole) is added, followed by a $CuCl_2 \cdot 2H_2O$ (20 g. in 30 ml. of water) solution. The solution is allowed to slowly warm to 15° C. and kept at that temperature until nitrogen is no longer evolved (4–6 hours). The solid is filtered and washed with 4 l. of water to yield 151 g. (75%). The solid is dissolved in 1.5 l. of dimethylformamide and then slowely added to 1-aminohydantoin hydrochloride (151 g., 1.0 mole) in 1 l. of water. The addition is made over a 2-hour period. The suspension is stirred for an additional 4 hours before pouring into 3 l. of water. The precipitate is filtered and air dried. The product is washed with acetone and then recrystallized from dimethylformamide and 60% ethanol to yield 123 g. (44%); M.P. 267–9° C.

*Analysis.*—Calcd. for $C_{14}H_9ClN_4O_5$: C, 48.22; H, 2.60; N, 16.07. Found: C, 48.42; H, 2.61; N, 15.86.

EXAMPLE VIII

1-[5-(2-methyl-4-nitrophenyl)furfurylideneamino] hydantoin

A suspension of 2-methyl-4-nitroaniline (76 g., 0.5 mole), concentrated hydrochloric acid (75 ml.) and water (100 ml.) is heated slightly for 15 minutes, partially dissolving the solid. Then an additional 150 ml. of concentrated hydrochloric acid is added. The suspension is cooled below 0° C. then treated with sodium nitrite solution (35 g., in 175 ml. of water) at such a rate the temperature does not rise above 5° C. The material is stirred for 15–20 minutes at this temperature, then furfural (48 g., 0.5 mole) in acetone followed by cupric chloride (10 g., in 15 ml. of water) is introduced. The solution is allowed to stir at 15–20° C. for 6 hours, then filtered and washed thoroughly with sodium carbonate solution. The aldehyde is dissolved in 750 ml. of dimethylformamide then introduced slowly to a solution of 1-aminohydantoin hydrochloride (76 g., 0.5 mole) and 1000 ml. of water to yield 76 gms. (45%). This may be recrystallized from dimethylformamide; M.P. 256–59° C.

*Analysis.*—Calcd. for $C_{15}H_{12}N_4O_5$: C, 54.88; H, 3.69; N, 17.07. Found: C, 54.93; H, 3.44; N, 16.63.

EXAMPLE IX

1-[5-(p-acetylphenyl)furfurylideneamino]hydantoin p-Aminoacetophenone (100 g., 0.75 mole) is treated with 322 ml. of concentrated HCl and 150 ml. of water. This suspension is stirred for 30 minutes before cooling to −5° C. To the cold solution is added a $NaNO_2$ solution (52 g., 0.75 mole in 200 ml. of water). The solution is stirred for 30 minutes at 0° before furfural (71 g., 0.75 mole) and cupric chloride dihydrate (15 g.) are added. The solution is allowed to warm slowly to 15° C. and is kept at that temperature until no more nitrogen is evolved. The precipitate is filtered and allowed to air dry overnight. The yield is 120 g. The aldehyde (90 g., 0.46 mole) is dissolved in 1600 ml. dimethylformamide and cooled to 15°. To this solution is added 1-aminohydantoin hydrochloride (60 g., 0.4 mole) in 900 ml. of water over a period of 1 hour, keeping the temperature below 20° C. After the addition is complete, the mixture is stirred for 1½ hours. The suspension is poured into 2 l. of water and the precipitate is filtered. The residue is washed with acetone and recrystallized from dimethylformamide and water to yield 95 g. (76% based on the aldehyde); M.P. 269–70° C.

*Analysis.*—Calcd. for $C_{16}H_{13}N_3O_4$: C, 61.73; H, 4.21; N, 13.50. Found: C, 61.58; H, 4.47; N, 13.24.

EXAMPLE X

1-[5-(p-nitrophenyl)furfurylideneamino] 2-imidazolidinone

A warm solution of 5-p-nitrophenyl-2-furfural (54 g., 0.25 mole) in 250 ml. of dimethylformamide is introduced to a solution of 1-amino-2-imidazolidinone (0.5 mole in water). The suspension is heated at 100° C. for 20 minutes, cooled. A crimson red solid is filtered and washed with ethanol and water. This may be recrystallized from dimethylformamide; M.P. 283–284° C.

*Analysis.*—Calcd. for $C_{14}H_{12}N_4O_4$: C, 56.00; H, 4.03; N, 18.66. Found: C, 55.73; H, 4.23; N, 18.39.

EXAMPLE XI

1-[5-(p-bromophenyl)furfurylideneamino]hydantoin

A mixture of p-bromoaniline (86 g., 0.5 mole), water (100 ml.), and hydrochloric acid (75 ml.) is heated for 15–20 minutes. Then an additional 150 ml. of hydrochloric acid is added. The suspension is cooled below 5° C. to introduce a sodium nitrite solution (35 g., in 150 ml. of water). The mixture is allowed to stir at 5° C. for 20 minutes; then solutions of furaldehyde (48 g., in acetone) and cupric chloride (10 g., in 20 ml. of water) are added. The solution is allowed to stir at a temperature between 15–20° C. for 4 hours. The liquor is decanted and the solid washed twice with water. The aldehyde is then dissolved in dimethylformamide and introduced to a solution of 1-amino-hydantoin hydrochloride (76 g., in 1000 ml. of water) to yield the product which is recrystallized from dimethylformamide, M.P. 284–85° C.

*Analysis.*—Calcd. for $C_{14}H_{10}BrN_3O_3$: C, 48.30; H, 2.90; N, 12.07. Found: C, 48.28; H, 2.85; N, 12.15.

EXAMPLE XII 3-butyl-1-[5-(p-nitrophenyl)furfurylidenamino] hydantoin

To a solution of the compound of Example I (78.5 g., 0.25 mole) and dimethylformamide (1000 ml.) is added, in small portions, sodium hydride (11 g., 55% with mineral oil). After the addition the mixture is allowed to stir 40–45 minutes, at which time the sodium salt precipitates. To the suspension is added n-butyl bromide (34.3 g., 0.25 mole). The temperature is raised to 120° C. and held for 18 hours in the presence of an excess of butyl bromide. The excess butyl bromide is removed; the material is cooled, then introduced to 4000 ml. of cold water. The yellow solid is filtered and washed thoroughly with water. There are obtained 92 grams of crude material which when recrystallized from ethanol has a M.P. 201.5–202° C.

*Analysis.*—Calcd. for $C_{18}H_{18}N_4O_5$: C, 58.37; H, 4.90; N, 15.13. Found: C, 58.41; H, 4.82; N, 15.06.

EXAMPLE XIII

1-[5-(p-carboxyphenyl)furfurylideneamino]hydantoin

A slurry of p-aminobenzoic acid (69 g., 0.5 ml.), 75 ml. of hydrochloric acid and 100 ml. of water is slightly heated for approximately 15 minutes, then an additional 150 ml. of hydrochloric acid is added. The suspension is cooled below 5° C. to introduce sodium nitrite (35 g., in 175 ml. of water) then allowed to react for 15–20 minutes at 0° C. The solution is then treated with furfural (48 g., in acetone) followed by cupric chloride (10 g., in 20 ml. water). The reaction temperature is allowed to rise to 15° C. and held for 6 hours. The aldehyde is filtered, washed with water and air dried. To a solution of 1-aminohydantoin (76. g., 0.5 m.) and 1000 ml. of water is added the aldehyde dissolved in 1500 ml. of dimethylformamide. The resulting suspension is poured into 4000 ml. of water and filtered. This may be recrystallized from dimethylformamide and washed with acetone in a 31% yield.

*Analysis.*—Calcd. for $C_{15}H_{11}N_3O_5$: C, 57.51; H, 3.54; N, 13.41. Found: C, 57.71; H, 3.75; N, 13.25.

EXAMPLE XIV

1-[5-(m-trifluoromethylphenyl)furfurylideneamino] hydantoin m-Trifluoromethylaniline (161 g., 1.0 mole) in 200 ml. of water is treated with 150 ml. of conc. HCl to produce a white suspension. An additional 300 ml. of conc. HCl and 200 ml. of water is added to the stirred slurry. The white suspension is cooled to −10° C. before a solution of $NaNO_2$ (70 g.) in 200 ml. of water is added dropwise over ½ hour. The temperature is maintained between −5 and 0° C. After the addition is complete, furfural (96 g., 1.0 mole) in 100 ml. of acetone is added, followed by 20 g. of $CuCl_2$ in 100 ml. of water. The mixture is slowly warmed to 20° C. over a 2-hour period and then stirred for an additional 5 hours. The lower layer is separated and washed with water. The dark oily residue is dissolved in 1 l. of dimethylformamide and then added slowly to 1-aminohydantoin hydrochloride (151 g., 1.0 mole). The yellow suspension is diluted with 2 l. of water and filtered to yield 82 g. (40%), M.P. 205–207° C.

*Analysis.*—Calcd. for $C_{15}H_{10}F_3N_3O$: C, 53.42; H, 2.99; N, 12.46. Found: C, 53.32; H, 3.31; N, 12.43.

EXAMPLE XV

1-[5-(2-chloro-5-trifluoromethylphenyl)furfurylideneamino]hydantoin

A slurry of 2-chloro-5-trifluoromethylaniline (97.8 g., 0.5 mole), conc. hydrochloric acid (75 ml.) and water (200 ml.) is heated until the suspension dissolves; then an additional 150 ml. of conc. hydrochloric acid is added. The suspension is cooled below 0° C.; then sodium nitrite (35 g., in 175 ml. of water) is added at a rate to keep the temperature below 5° C. After stirring for 20–30 minutes, a solution of furfural (48 g. in acetone) and cupric chloride (10 gm. in 15 ml. of water) is added. The material is stirred at 15–20° C. for two hours, then placed in an ice bath at 5–10° C. overnight. The dark oil is washed with water thoroughly (decanting), then dissolved in dimethylformamide. The aldehyde is then introduced to a solution of 1-amino-hydantoin hydrochloride (76 g., in 1000 ml. of water) to yield 181 gm. of product which may be recrystallized from acetonitrile, M.P. 244–246° C.

*Analysis.*—Calcd. for $C_{15}H_{19}ClF_3N_3O$: C, 48.47; H, 2.44; N, 11.30. Found: C, 48.56; H, 2.72; N, 11.07.

EXAMPLE XVI

1-[5-(2-furyl)furfurylideneamino]hydantoin

To a solution of 1-aminohydantoin hydrochloride (60 g., 0.4 m.) and 1200 ml. of water is slowly introduced a solution of 5-(2-furyl)-2-furaldehyde (65 g., 0.4 m.) and 200 ml. of dimethylformamide. A white solid forms immediately which is filtered and washed with water to yield 60 gms. The material may be purified from dimethylformamide and ethanol, M.P. 241–43° C.

*Analysis.*—Calcd. for $C_{12}H_9N_3O_4$: C, 55.60; H, 3.50; N, 16.21. Found: C, 55.59; H, 3.58; N, 16.10.

EXAMPLE XVII

1-[5-(p-nitrophenyl)furfurylideneamino]-3-2-(4-pyridyl)ethyl hydantoin

A suspension of the compound of Example I (31.4 grams, 0.1 mole), pyridine (170 ml.) and 4-vinylpyridine (10.5 g., 0.1 m.) is refluxed for 27 hours. The mixture dissolves after 3–4 hours of refluxing. The resulting solution is cooled, then poured into water and filtered. The filter cake is thoroughly washed with water to yield 40 grams (98% yield) which may be recrystallized from dimethylformamide and ethanol; M.P. 227–230° C.

*Analysis.*—Calcd. for $C_{21}H_{17}N_5O_5$: C, 60.14; H, 4.09; N, 16.70. Found: C, 59.70; H, 4.01; N, 16.45.

EXAMPLE XVIII

1-[5-(p-cyanophenyl)furfurylideneamino]hydantoin

A suspension of p-aminobenzonitrile (50 g., 0.5 mole), water (100 ml.) and concentrated hydrochloric acid (75 ml.) is heated until dissolved. An additional 150 ml. of conc. hydrochloric acid is added, and the suspension is cooled below 0° C. To the suspension is added sodium nitrite (35 g., in 200 ml. of water). The material is stirred at 5° C. for 30 minutes; then solutions of furaldehyde (48 g., in acetone) and cupric chloride (10 g., in 20 ml. of water) are added. The temperature is allowed to rise to 15–20° C. and the solution stirred for 4 hours. The solids are filtered and washed with water. The 5-(p-cyanophenyl)-2-furaldehyde is purified from ethanol. The aldehyde is dissolved in 800 ml. of dimethylformamide and slowly introduced into a solution of 1-aminohydantoin hydrochloride (91 g., 0.6 mole in 1000 ml. of water). The yellow solid (96 g., 65%) is filtered and washed thoroughly with water. The material is purified by washing with acetone; then recrystallizing from dimethylformamide, ethanol and water, M.P. 281–285° C. with decomposition.

*Analysis.*—Calcd. for $C_{15}H_{10}N_4O_3$: C, 61.22; H, 3.42; N, 19.04. Found: C, 61.15; H, 3.68; N, 18.66.

EXAMPLE XIX 3-(2-hydroxyethyl)-1-[5-(p-nitrophenyl)furfurylideneamino]hydantoin To 62.8 g. (0.2 mole) of the compound of Example I and 1000 ml. of dimethylformamide is added in small portions 9.6 grams of sodium hydride (50% mineral oil). After the sodium salt precipitates from solution, 50 grams of 2-bromoethanol (0.4 mole) is introduced. The temperature is raised to 60° C. and held for 18 hours. The solution is then poured into 4000 ml. of ice water. The solid is filtered and air dried overnight, then dried at 60° C. for 4 hours to yield 66 g. (92%) which may be recrystallized from dimethylformamide (3 ml./gm.), M.P. 245.5–247° C.

*Analysis.*—Calcd. for $C_{16}H_{14}N_4O_6$: C, 53.63; H, 3.94; N, 15.64. Found: C, 53.65; H, 4.05; N, 15.61.

EXAMPLE XX

1-[(5-phenyl)furfurylideneamino]hydantoin (A) In a flask equipped with a mechanical stirrer, thermometer, additional funnel, nitrogen inlet tube, and drying tube is placed dimethylformamide (21.9 g., 0.3 mole). To the amide cautiously is added 45.9 g. of phosphorus oxychloride (0.3 mole). The resulting solid is allowed to set for 0.5 hour, then heated to 30° C. With mixing, 2-phenylfuran (37 g., 0.27 mole) is added. The exothermic reaction is controlled with an ice bath (max. 40° C.). The material is allowed to stir for 2 hours, then heated for 1 hour with a steam bath. The reaction mixture is poured into 500 ml. of ice water and neutralized with potassium carbonate. The solution is extracted with 2×1000 ml. portions of ether. The ether extracts are stripped and the residue is fractionally distilled to yield 31 g. of 5-phenylfurfural (B.P. 122–123°/0.25 mm.).

(B) To a solution of 1-aminohydantoin hydrochloride (45 g., 0.3 mole) and 250 ml. of water is added a solution of 5-phenylfurfural (36 g., 0.21 m.) and 150 ml. of dimethylformamide. The suspension is stirred for 2 hours and then poured into 2000 ml. of cold water to yield 51 g. (94%) of 1-(5-phenylfurfurylidene)amino hydantoin; M.P. 258–260° C.

*Analysis.*—Calcd. for $C_{14}H_{11}N_3O_3$: C, 62.87; H, 4.84; N, 18.33. Found: C, 62.87; H, 5.03; N, 18.53.

What is claimed is:

1. A compound of the formula:

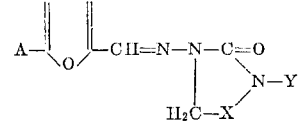

wherein

A is a member of the group consisting of furyl and

in which R is from one to two substituents selected from the group consisting of nitro, cyano, amino, chloro, bromo, acetyl, carboxy, methyl, trifluoromethyl, and hydrogen;

X is a member of the group consisting of carbonyl and methylene; and

Y is a member of the group consisting of hydroxyethyl, butyl, hydrogen, and 4-pyridylethyl.

2. The compound 1-[5-(p-nitrophenyl)furfurylideneamino]hydantoin.

3. The compound 1-[5-(p-aminophenyl)furfurylideneamino]hydantoin.

4. The compound 1-[5-(m-nitrophenyl)furfurylideneamino]hydantoin.

5. The compound 1-[5-(p-chlorophenyl)furfurylideneamino]hydantoin.

6. The compound 1-[5-(2,4-dichlorophenyl)furfurylideneamino]hydantoin.

7. The compound 1-[5-(2-methyl-4-nitrophenyl)furfurylideneamino]hydantoin.

8. The compound 1-[5-(p-nitrophenyl)furfurylideneamino]-2-imidazolidinone.

9. The compound 1-[5-(p-cyanophenyl)furfurylideneamino]hydantoin.

References Cited

UNITED STATES PATENTS

| 3,076,805 | 2/1963 | Michels | 260—240 |
| 2,746,960 | 5/1956 | Gever et al. | 260—240 |

FOREIGN PATENTS

| 1,147,590 | 4/1963 | Germany. |

HENRY R. JILES, *Primary Examiner.*

H. I. MOATZ, *Assistant Examiner.*

U.S. Cl. X.R.

167—65

UNITED STATES PATENT OFFICE
CERTIFICATE OF CORRECTION

Patent No. 3,415,821                                                  December 10, 19

Charles Stewert Davis et al.

It is certified that error appears in the above identified patent and that said Letters Patent are hereby corrected as shown below:

Column 1, line 11, "substitued" should read -- substituted --; lines 17 and 18, "(5-substituted" should read -- (5-substituted) --. Column 2, line 12, "pharmeceutical" should read -- pharmaceutical --; line 50, "nitrate" should read -- nitrite --. Column 3, line 47, "nitride" should read -- nitrite --; line 55, "solutions" should read -- solution --. Column 5, line 15, "nitride" should read -- nitrite --.

Signed and sealed this 17th day of March 1970.

(SEAL)
Attest:

Edward M. Fletcher, Jr.                                  WILLIAM E. SCHUYLER, JR.
Attesting Officer                                                     Commissioner of Patents

UNITED STATES PATENT OFFICE
CERTIFICATE OF CORRECTION

Patent No. 3,415,821                          December 10, 1968

Charles Stewert Davis et al.

It is certified that error appears in the above identified patent and that said Letters Patent are hereby corrected as shown below:

Column 3, line 11, "p-chlorophenyl" should read -- (p-chlorophenyl) --.

Signed and sealed this 19th day of May 1970.

(SEAL)
Attest:

Edward M. Fletcher, Jr.                       WILLIAM E. SCHUYLER, JR.

Attesting Officer                               Commissioner of Patents